(12) United States Patent
Guo et al.

(10) Patent No.: US 12,063,505 B2
(45) Date of Patent: Aug. 13, 2024

(54) VEHICLE-TO-EVERYTHING (V2X) SECURITY POLICY NEGOTIATION BETWEEN PEER USER EQUIPMENT (UES)

(71) Applicant: Apple Inc., Cupertino, CA (US)

(72) Inventors: Shu Guo, Cupertino, CA (US); Xiangying Yang, Cupertino, CA (US); Yuqin Chen, Cupertino, CA (US); Fangli Xu, Cupertino, CA (US); Zhibin Wu, Los Altos, CA (US); Dawei Zhang, Saratoga, CA (US); Huarui Liang, Cupertino, CA (US); Haijing Hu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/442,778

(22) PCT Filed: Apr. 1, 2020

(86) PCT No.: PCT/US2020/026119
§ 371 (c)(1),
(2) Date: Sep. 24, 2021

(87) PCT Pub. No.: WO2021/201857
PCT Pub. Date: Oct. 7, 2021

(65) Prior Publication Data
US 2023/0032220 A1  Feb. 2, 2023

(51) Int. Cl.
*H04W 12/08* (2021.01)
*H04W 12/67* (2021.01)

(52) U.S. Cl.
CPC .......... *H04W 12/08* (2013.01); *H04W 12/67* (2021.01)

(58) Field of Classification Search
CPC .............................. H04W 12/08; H04W 12/67
See application file for complete search history.

(56) References Cited

U.S. PATENT DOCUMENTS

| | | | |
|---|---|---|---|
| 7,293,061 B2 * | 11/2007 | Dowling | H04W 12/02 709/227 |
| 2006/0143693 A1 * | 6/2006 | Glickman | H04W 12/50 726/3 |

(Continued)

FOREIGN PATENT DOCUMENTS

| | | | | |
|---|---|---|---|---|
| CN | 110944406 A | 3/2020 | | |
| WO | WO-2016148819 A1 * | 9/2016 | ............. | H04L 9/083 |
| WO | WO-2020150706 A1 * | 7/2020 | ............. | H04W 12/04 |

OTHER PUBLICATIONS

Unknown author, "The Evolution of Security in 5G", 41 pages. (Year: 2018).*

(Continued)

*Primary Examiner* — Ponnoreay Pich
(74) *Attorney, Agent, or Firm* — Eschweiler & Potashnik, LLC

(57) ABSTRACT

Techniques discussed herein can facilitate improved security establishment procedures for Vehicle to Everything (V2X) direct connections. Various embodiments are employable at or comprise User Equipment, and can initiate and/or receive V2X security establishment connections wherein a receiving UE can reject the connection based on the initiating UE's capabilities/policy and/or the initiating UE can make the final decision regarding the connection based at least on receiving security policy and capability information from the receiving UE.

20 Claims, 8 Drawing Sheets

(56) References Cited

U.S. PATENT DOCUMENTS

| | | | | |
|---|---|---|---|---|
| 2010/0130168 A1* | 5/2010 | Mizikovsky | .......... | H04L 63/205 |
| | | | | 455/410 |
| 2016/0205128 A1* | 7/2016 | Holtmanns | .......... | H04W 12/37 |
| | | | | 726/1 |
| 2016/0269903 A1* | 9/2016 | Zhang | .................... | H04W 8/08 |
| 2017/0126682 A1* | 5/2017 | Wong | ................. | H04W 12/069 |
| 2019/0223008 A1* | 7/2019 | Vanderveen | .......... | H04L 9/0825 |
| 2020/0100088 A1* | 3/2020 | Kim | ...................... | H04W 48/16 |
| 2020/0137577 A1* | 4/2020 | Li | ......................... | H04W 12/08 |
| 2020/0221298 A1* | 7/2020 | Pan | ....................... | H04W 12/50 |
| 2022/0132307 A1* | 4/2022 | Perras | .................. | H04W 12/50 |
| 2023/0032220 A1* | 2/2023 | Guo | ..................... | H04W 12/67 |

OTHER PUBLICATIONS

International Search Report Dated Dec. 18, 2020 for International Application PCT/US2020/026119.

International Written Opinion Dated Dec. 18, 2020 for International Application PCT/US2020/026119.

"3rd Generation Partnership Project; Technical Specification Group Services and System Aspects; Security Aspect of 3GPP Support for Advanced Vehicle-to-Everything (V2X) Services (Release 16)"; 3GPP Standard, Technical Specification; 3GPP TS 33.536; Mar. 9, 2020; URL:ftp://ftp.3gpp.org/Specs/archive/33_series/33.536/33536-030.zipS3-200440_TS33536_eV2Xsecurity-030-cl.docx.

* cited by examiner

VEHICLE-TO-EVERYTHING (V2X) SECURITY POLICY NEGOTIATION BETWEEN PEER USER EQUIPMENT (UES)

REFERENCE TO RELATED APPLICATIONS

This application is a National Phase entry application of International Patent Application No. PCT/US2020/026119 filed Apr. 1, 2020, entitled "VEHICLE-TO-EVERYTHING (V2X) SECURITY POLICY NEGOTIATION BETWEEN PEER USER EQUIPMENTS (UES)", the contents of which are herein incorporated by reference in their entirety.

BACKGROUND

Mobile communication in the next generation wireless communication system, 5G, or new radio (NR) network will provide ubiquitous connectivity and access to information, as well as ability to share data, around the globe. 5G networks and network slicing will be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

Some services have ultra-low latency, high data capacity, and strict reliability requirements, as any faults or performance issues in the networks can cause service failure which may result in property damage and body injury. A type of mobile communication includes vehicle communication, where vehicles communicate or exchange vehicle related information. The vehicle communication can include vehicle to everything (V2X), which can include vehicle to vehicle (V2V), vehicle to infrastructure (V2I), and vehicle to pedestrian (V2P), or the like, in which each can include a user equipment (UE) or base station device such as a next generation NodeB (gNB), an eNB (Enhanced UMTS (Universal Mobile Telecommunications System) Terrestrial Radio Access Network (E-UTRAN) NodeB), or other device/node. A V2X node, for example, can comprises a new radio NodeB (gNB), an eNodeB (eNB), a user equipment (UE), a Roadside Unit (RSU), a drone, or other vehicle device, or network device when referred to herein. In some situations, vehicle related information is intended for a single vehicle or other entity. In other situations, such as emergency alerts, vehicle related information is intended for a large number of vehicles or other device entities. The emergency alerts can include collision warnings, control loss warnings, collision avoidance, pedestrian safety and other coordination to ensure safe and efficient traffic flows, especially in vehicle (e.g., auto, craft, drone, etc.) to vehicle communications.

DETAILED DESCRIPTION

Figure 1:
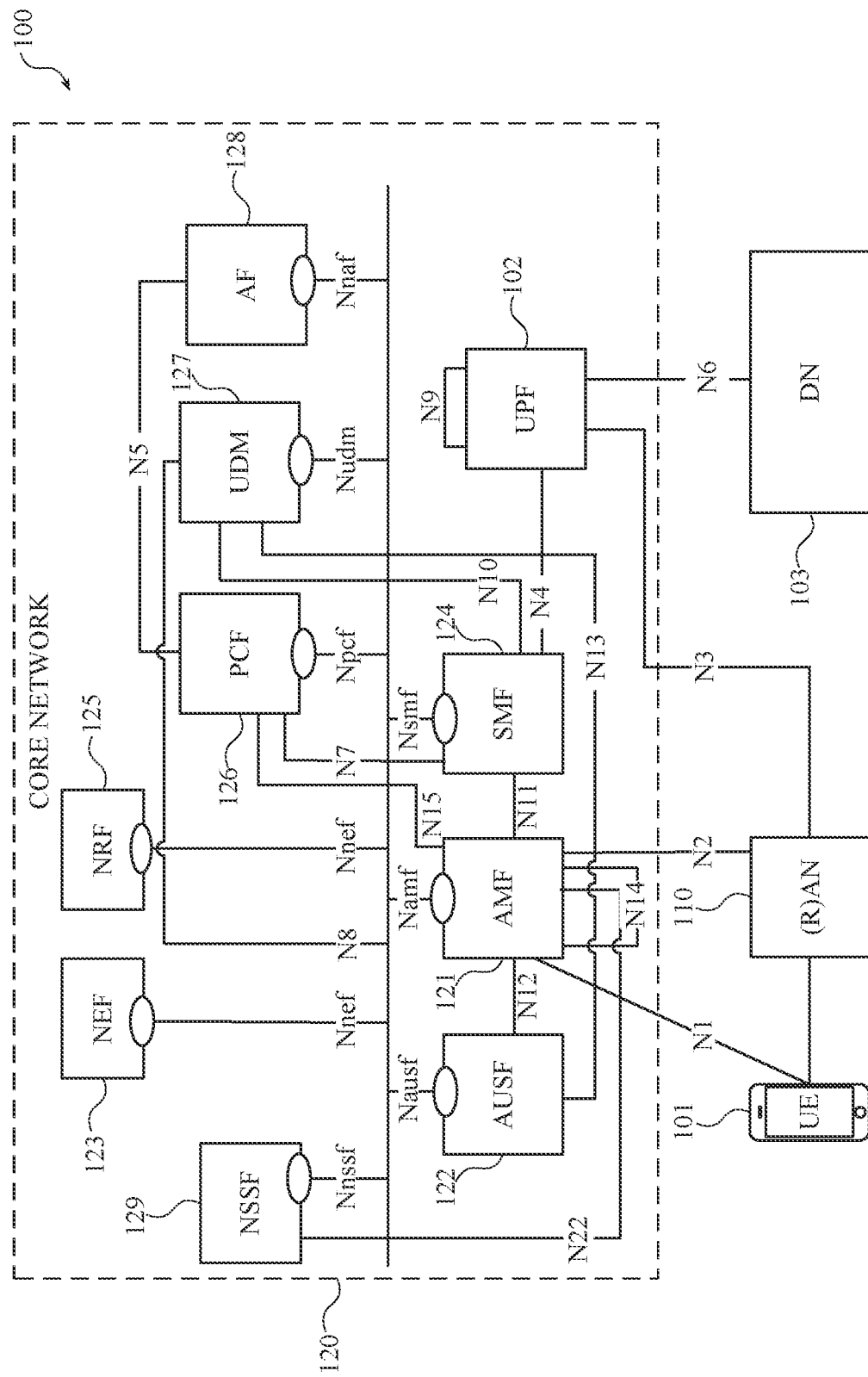
FIG. 1 is a block diagram illustrating an architecture of a system including a Core Network (CN), for example a Fifth Generation (5G) CN (5GC), in accordance with various embodiments.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone or other device configured to communicate via a 3GPP RAN, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more," unless the context indicates otherwise (e.g., "the empty set," "a set of two or more Xs," etc.).

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context may indicate that they are distinct or that they are the same.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

Various aspects discussed herein can relate to facilitating wireless communication, and the nature of these communications can vary.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments described herein can be implemented into a system using any suitably configured hardware and/or software. FIG. 1 illustrates an architecture of a system 100 including a Core Network (CN) 120, for example a Fifth Generation (5G) CN (5GC), in accordance with various embodiments. The system 100 is shown to include a UE 101, which can be the same or similar to one or more other UEs discussed herein; a Third Generation Partnership Project (3GPP) Radio Access Network (Radio AN or RAN) or other (e.g., non-3GPP) AN, (R)AN 210, which can include one or more RAN nodes (e.g., Evolved Node B(s) (eNB(s)), next generation Node B(s) (gNB(s), and/or other nodes) or other nodes or access points; and a Data Network (DN) 203, which can be, for example, operator services, Internet access or third party services; and a Fifth Generation Core Network (5GC) 120. The 5GC 120 can comprise one or more of the following functions and network components: an Authentication Server Function (AUSF) 122; an Access and Mobility Management Function (AMF) 121; a Session Management Function (SMF) 124; a Network Exposure Function (NEF) 123; a Policy Control Function (PCF) 126; a Network Repository Function (NRF) 125; a Unified Data Management (UDM) 127; an Application Function (AF) 128; a User Plane (UP) Function (UPF) 102; and a Network Slice Selection Function (NSSF) 129.

The UPF 102 can act as an anchor point for intra-RAT and inter-RAT mobility, an external Protocol Data Unit (PDU) session point of interconnect to DN 103, and a branching point to support multi-homed PDU session. The UPF 102 can also perform packet routing and forwarding, perform packet inspection, enforce the user plane part of policy rules, lawfully intercept packets (UP collection), perform traffic usage reporting, perform QoS handling for a user plane (e.g., packet filtering, gating, Uplink (UL)/Downlink (DL) rate enforcement), perform Uplink Traffic verification (e.g., Service Data Flow (SDF) to QoS flow mapping), transport level packet marking in the uplink and downlink, and perform downlink packet buffering and downlink data notification triggering. UPF 102 can include an uplink classifier to support routing traffic flows to a data network. The DN 103 can represent various network operator services, Internet access, or third-party services. DN 103 can include, or be similar to, an application server. The UPF 102 can interact with the SMF 124 via an N4 reference point between the SMF 124 and the UPF 102.

The AUSF 122 can store data for authentication of UE 101 and handle authentication-related functionality. The AUSF 122 can facilitate a common authentication framework for various access types. The AUSF 122 can communicate with the AMF 121 via an N12 reference point between the AMF 121 and the AUSF 122; and can communicate with the UDM 127 via an N13 reference point between the UDM 127 and the AUSF 122. Additionally, the AUSF 122 can exhibit an Nausf service-based interface.

The AMF 121 can be responsible for registration management (e.g., for registering UE 101, etc.), connection management, reachability management, mobility management, and lawful interception of AMF-related events, and access authentication and authorization. The AMF 121 can be a termination point for the an N11 reference point between the AMF 121 and the SMF 124. The AMF 121 can provide transport for SM messages between the UE 101 and the SMF 124, and act as a transparent proxy for routing SM messages. AMF 121 can also provide transport for SMS messages between UE 101 and a Short Message Service (SMS) Function (SMSF) (not shown in FIG. 1). AMF 121 can act as SEcurity Anchor Function (SEAF), which can include interaction with the AUSF 122 and the UE 101 and/or receipt of an intermediate key that was established as a result of the UE 101 authentication process. Where Universal Subscriber Identity Module (USIM) based authentication is used, the AMF 121 can retrieve the security material from the AUSF 122. AMF 121 can also include a Single-Connection Mode (SCM) function, which receives a key from the SEA that it uses to derive access-network specific keys. Furthermore, AMF 121 can be a termination point of a RAN Control Plane (CP) interface, which can include or be an N2 reference point between the (R)AN 110 and the AMF 121; and the AMF 121 can be a termination point of Non Access Stratum (NAS) (N1) signaling, and perform NAS ciphering and integrity protection.

AMF 121 can also support NAS signaling with a UE 101 over an Non-3GPP (N3) Inter Working Function (IWF) interface. The N3IWF can be used to provide access to untrusted entities. N3IWF can be a termination point for the N2 interface between the (R)AN 110 and the AMF 121 for the control plane, and can be a termination point for the N3 reference point between the (R)AN 110 and the UPF 102 for the user plane. As such, the AMF 121 can handle N2 signaling from the SMF 124 and the AMF 121 for PDU sessions and QoS, encapsulate/de-encapsulate packets for Internet Protocol (IP) Security (IPSec) and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signaling between the UE 101 and AMF 121 via an N1 reference point between the UE 101 and the AMF 121, and relay uplink and downlink user-plane packets between the UE 101 and UPF 102. The N3IWF also provides mechanisms for IPsec tunnel establishment with the UE 101. The AMF 121 can exhibit an Namf service-based interface, and can be a termination point for an N14 reference point between two AMFs 121 and an N17 reference point between the AMF 121 and a 5G Equipment Identity Register (5G-EIR) (not shown in FIG. 1).

The UE 101 can be registered with the AMF 121 in order to receive network services. Registration Management (RM) is used to register or deregister the UE 101 with the network (e.g., AMF 121), and establish a UE context in the network (e.g., AMF 121). The UE 101 can operate in an RM-REGISTERED state or an RM-DEREGISTERED state. In the RM-DEREGISTERED state, the UE 101 is not registered with the network, and the UE context in AMF 121 holds no valid location or routing information for the UE 101 so the UE 101 is not reachable by the AMF 121. In the RM-REGISTERED state, the UE 101 is registered with the network, and the UE context in AMF 121 can hold a valid location or routing information for the UE 101 so the UE 101 is reachable by the AMF 121. In the RM-REGISTERED state, the UE 101 can perform mobility Registration Update procedures, perform periodic Registration Update procedures triggered by expiration of the periodic update timer (e.g., to notify the network that the UE 101 is still active), and perform a Registration Update procedure to update UE capability information or to re-negotiate protocol parameters with the network, among others.

The AMF 121 can store one or more RM contexts for the UE 101, where each RM context is associated with a specific access to the network. The RM context can be a data structure, database object, etc. that indicates or stores, inter alia, a registration state per access type and the periodic update timer. The AMF 121 can also store a 5GC Mobility Management (MM) context that can be the same or similar to an (Enhanced Packet System (EPS))MM ((E)MM) context. In various embodiments, the AMF 121 can store a Coverage Enhancement (CE) mode B Restriction parameter of the UE 101 in an associated MM context or RM context. The AMF 121 can also derive the value, when needed, from the UE's usage setting parameter already stored in the UE context (and/or MM/RM context).

Connection Management (CM) can be used to establish and release a signaling connection between the UE 101 and the AMF 121 over the N1 interface. The signaling connection is used to enable NAS signaling exchange between the UE 101 and the CN 120, and comprises both the signaling connection between the UE and the AN (e.g., RRC connection or UE-N3IWF connection for non-3GPP access) and the N2 connection for the UE 101 between the AN (e.g., RAN 110) and the AMF 121. The UE 101 can operate in one of two CM states, CM-IDLE mode or CM-CONNECTED mode. When the UE 101 is operating in the CM-IDLE state/mode, the UE 101 may have no NAS signaling connection established with the AMF 121 over the N1 interface, and there can be (R)AN 110 signaling connection (e.g., N2 and/or N3 connections) for the UE 101. When the UE 101 is operating in the CM-CONNECTED state/mode, the UE 101 can have an established NAS signaling connection with the AMF 121 over the N1 interface, and there can be a (R)AN 110 signaling connection (e.g., N2 and/or N3 connections) for the UE 101. Establishment of an N2 connection between the (R)AN 110 and the AMF 121 can cause the UE 101 to transition from CM-IDLE mode to CM-CONNECTED mode, and the UE 101 can transition from the CM-CONNECTED mode to the CM-IDLE mode when N2 signaling between the (R)AN 110 and the AMF 121 is released.

The SMF 124 can be responsible for Session Management (SM) (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to Lawful Interception (LI) system); termination of SM parts of NAS messages; downlink data notification; initiating AN specific SM information, sent via AMF over N2 to AN; and determining Session and Service Continuity (SSC) mode of a session. SM can refer to management of a PDU session, and a PDU session or "session" can refer to a PDU connectivity service that provides or enables the exchange of PDUs between a UE 101 and a data network (DN) 103 identified by a Data Network Name (DNN). PDU sessions can be established upon UE 101 request, modified upon UE 101 and 5GC 120 request, and released upon UE 101 and 5GC 120 request using NAS SM signaling exchanged over the N1 reference point between the UE 101 and the SMF 124. Upon request from an application server, the 5GC 120 can trigger a specific application in the UE 101. In response to receipt of the trigger message, the UE 101 can pass the trigger message (or relevant parts/information of the trigger message) to one or more identified applications in the UE 101. The identified application(s) in the UE 101 can establish a PDU session to a specific DNN. The SMF 124 can check whether the UE 101 requests are compliant with user subscription information associated with the UE 101. In this regard, the SMF 124 can retrieve and/or request to receive update notifications on SMF 124 level subscription data from the UDM 127.

The SMF 124 can include the following roaming functionality: handling local enforcement to apply QoS Service Level Agreements (SLAs) (Visited Public Land Mobile Network (VPLMN)); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 124 can be included in the system 100, which can be between another SMF 124 in a visited network and the SMF 124 in the home network in roaming scenarios. Additionally, the SMF 124 can exhibit the Nsmf service-based interface.

The NEF 123 can provide means for securely exposing the services and capabilities provided by 3GPP network functions for third party, internal exposure/re-exposure, Application Functions (e.g., AF 128), edge computing or fog computing systems, etc. In such embodiments, the NEF 123 can authenticate, authorize, and/or throttle the AFs. NEF 123 can also translate information exchanged with the AF 128 and information exchanged with internal network functions. For example, the NEF 123 can translate between an AF-Service-Identifier and an internal 5GC information. NEF 123 can also receive information from other network functions (NFs) based on exposed capabilities of other network functions. This information can be stored at the NEF 123 as structured data, or at a data storage NF using standardized interfaces. The stored information can then be re-exposed by the NEF 123 to other NFs and AFs, and/or used for other purposes such as analytics. Additionally, the NEF 123 can exhibit an Nnef service-based interface.

The NRF 125 can support service discovery functions, receive NF discovery requests from NF instances, and provide the information of the discovered NF instances to the NF instances. NRF 125 also maintains information of available NF instances and their supported services. As used herein, the terms "instantiate," "instantiation," and the like can refer to the creation of an instance, and an "instance" can refer to a concrete occurrence of an object, which can occur, for example, during execution of program code. Additionally, the NRF 125 can exhibit the Nnrf service-based interface.

The PCF 126 can provide policy rules to control plane function(s) to enforce them, and can also support unified policy framework to govern network behavior. The PCF 126 can also implement an FE to access subscription information relevant for policy decisions in a UDR of the UDM 127. The PCF 126 can communicate with the AMF 121 via an N15 reference point between the PCF 126 and the AMF 121, which can include a PCF 126 in a visited network and the AMF 121 in case of roaming scenarios. The PCF 126 can communicate with the AF 128 via an N5 reference point between the PCF 126 and the AF 128; and with the SMF 124 via an N7 reference point between the PCF 126 and the SMF 124. The system 100 and/or CN 120 can also include an N24 reference point between the PCF 126 (in the home network) and a PCF 126 in a visited network. Additionally, the PCF 126 can exhibit an Npcf service-based interface.

The UDM 127 can handle subscription-related information to support the network entities' handling of communication sessions, and can store subscription data of UE 101. For example, subscription data can be communicated between the UDM 127 and the AMF 121 via an N8 reference point between the UDM 127 and the AMF. The UDM 127 can include two parts, an application Functional Entity (FE) and a Unified Data Repository (UDR) (the FE and UDR are not shown in FIG. 1). The UDR can store subscription data and policy data for the UDM 127 and the PCF 126, and/or structured data for exposure and application data (including Packet Flow Descriptions (PFDs) for application detection, application request information for multiple UEs 101) for the NEF 123. The Nudr service-based interface can be exhibited by the UDR 221 to allow the UDM 127, PCF 126, and NEF 123 to access a particular set of the stored data, as well as to read, update (e.g., add, modify), delete, and subscribe to notification of relevant data changes in the UDR. The UDM can include a UDM-FE, which is in charge of processing credentials, location management, subscription management and so on. Several different FEs can serve the same user in different transactions. The UDM-FE accesses subscription information stored in the UDR and performs authentication credential processing, user identification handling, access authorization, registration/mobility management, and subscription management. The UDR can interact with the SMF 124 via an N10 reference point between the UDM 127 and the SMF 124. UDM 127 can also support SMS management, wherein an SMS-FE implements similar application logic as discussed elsewhere herein. Additionally, the UDM 127 can exhibit the Nudm service-based interface.

The AF 128 can provide application influence on traffic routing, provide access to NEF 123, and interact with the policy framework for policy control. 5GC 120 and AF 128 can provide information to each other via NEF 123, which can be used for edge computing implementations. In such implementations, the network operator and third party services can be hosted close to the UE 101 access point of attachment to achieve an efficient service delivery through the reduced end-to-end latency and load on the transport network. For edge computing implementations, the 5GC can select a UPF 102 close to the UE 101 and execute traffic steering from the UPF 102 to DN 103 via the N6 interface. This can be based on the UE subscription data, UE location, and information provided by the AF 128. In this way, the AF 128 can influence UPF (re)selection and traffic routing. Based on operator deployment, when AF 128 is considered to be a trusted entity, the network operator can permit AF 128 to interact directly with relevant NFs. Additionally, the AF 128 can exhibit an Naf service-based interface.

The NSSF 129 can select a set of network slice instances serving the UE 101. The NSSF 129 can also determine allowed Network Slice Selection Assistance Information (NSSAI) and the mapping to the subscribed Single NSSAIs (S-NSSAIs), as appropriate. The NSSF 129 can also determine the AMF set to be used to serve the UE 101, or a list of candidate AMF(s) 121 based on a suitable configuration and possibly by querying the NRF 125. The selection of a set of network slice instances for the UE 101 can be triggered by the AMF 121 with which the UE 101 is registered by interacting with the NSSF 129, which can lead to a change of AMF 121. The NSSF 129 can interact with the AMF 121 via an N22 reference point between AMF 121 and NSSF 129; and can communicate with another NSSF 129 in a visited network via an N31 reference point (not shown in FIG. 1). Additionally, the NSSF 129 can exhibit an Nnssf service-based interface.

As discussed previously, the CN 120 can include an SMSF, which can be responsible for SMS subscription checking and verification, and relaying SM messages to/from the UE 101 to/from other entities, such as an SMS-Gateway Mobile services Switching Center (GMSC)/Inter-Working MSC (IWMSC)/SMS-router. The SMSF can also interact with AMF 121 and UDM 127 for a notification procedure that the UE 101 is available for SMS transfer (e.g., set a UE not reachable flag, and notifying UDM 127 when UE 101 is available for SMS).

The CN 120 can also include other elements that are not shown in FIG. 1, such as a Data Storage system/architecture, a 5G-EIR, a Security Edge Protection Proxy (SEPP), and the like. The Data Storage system can include a Structured Data Storage Function (SDSF), an Unstructured Data Storage Function (UDSF), and/or the like. Any NF can store and retrieve unstructured data into/from the UDSF (e.g., UE contexts), via N18 reference point between any NF and the UDSF (not shown in FIG. 1). Individual NFs can share a UDSF for storing their respective unstructured data or individual NFs can each have their own UDSF located at or near the individual NFs. Additionally, the UDSF can exhibit an Nudsf service-based interface (not shown in FIG. 1). The 5G-EIR can be an NF that checks the status of Permanent Equipment Identifier (PEI) for determining whether particular equipment/entities are blacklisted from the network; and the SEPP can be a non-transparent proxy that performs topology hiding, message filtering, and policing on inter-PLMN control plane interfaces.

Additionally, there can be many more reference points and/or service-based interfaces between the NF services in the NFs; however, these interfaces and reference points have been omitted from FIG. 1 for clarity. In one example, the CN 120 can include an Nx interface, which is an inter-CN interface between the MME (e.g., a non-5G MME) and the AMF 121 in order to enable interworking between CN 120 and a non-5G CN. Other example interfaces/reference points can include an N5g-EIR service-based interface exhibited by a 5G-EIR, an N27 reference point between the Network Repository Function (NRF) in the visited network and the NRF in the home network; and an N31 reference point between the NSSF in the visited network and the NSSF in the home network.

Figure 2:
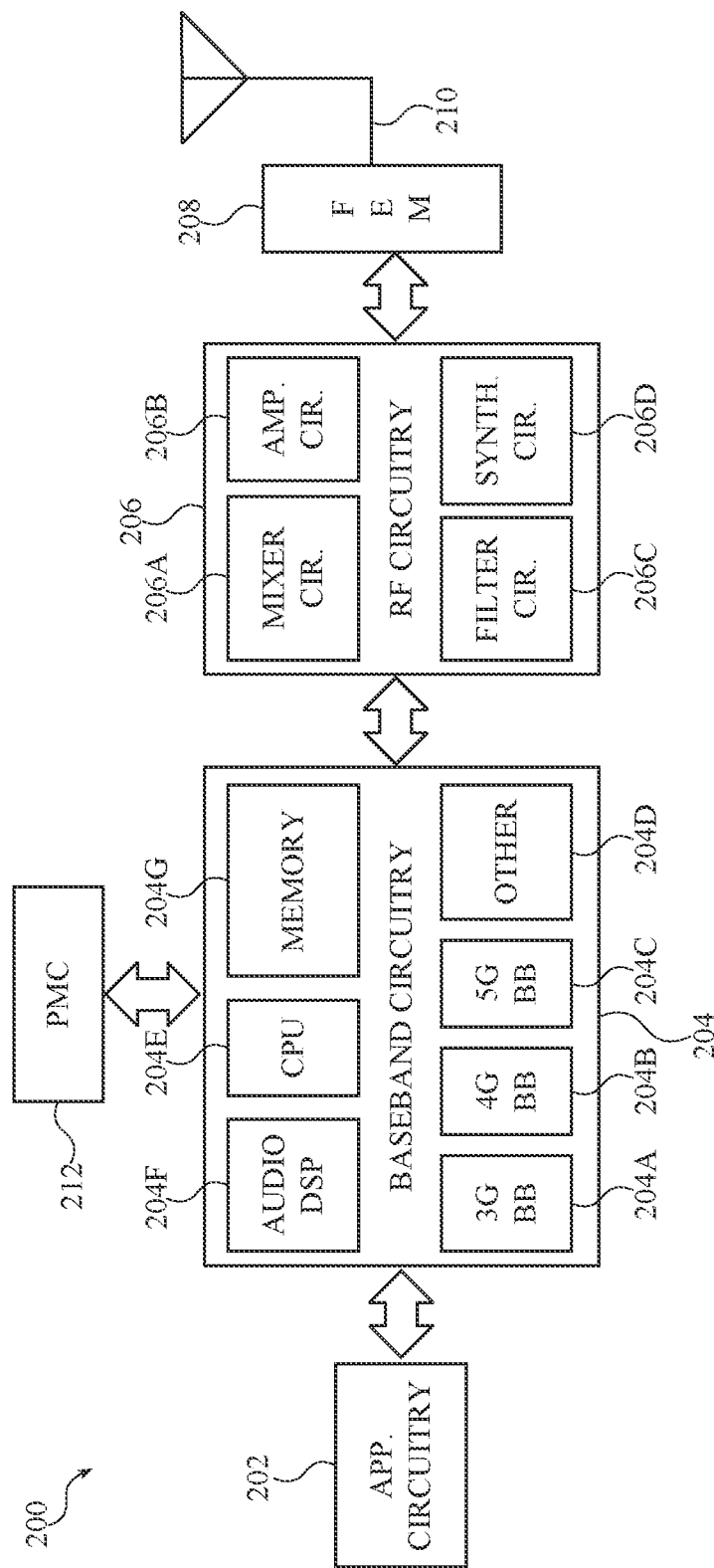
FIG. 2 is a diagram illustrating example components of a device that can be employed in accordance with various aspects discussed herein.

FIG. 2 illustrates example components of a device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node. In some embodiments, the device 200 can include fewer elements (e.g., a RAN node may not utilize application circuitry 202, and instead include a processor/controller to process IP data received from a CN such as 5GC 120 or an Evolved Packet Core (EPC)). In some embodiments, the device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tailbiting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 204 can include one or more audio digital signal processor(s) (DSP) 204F. The audio DSP(s) 204F can include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with a NG-RAN, an evolved universal terrestrial radio access network (EUTRAN) or other wireless metropolitan area networks (WMAN), a wireless local area network (WLAN), a wireless personal area network (WPAN), etc. Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for superheterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
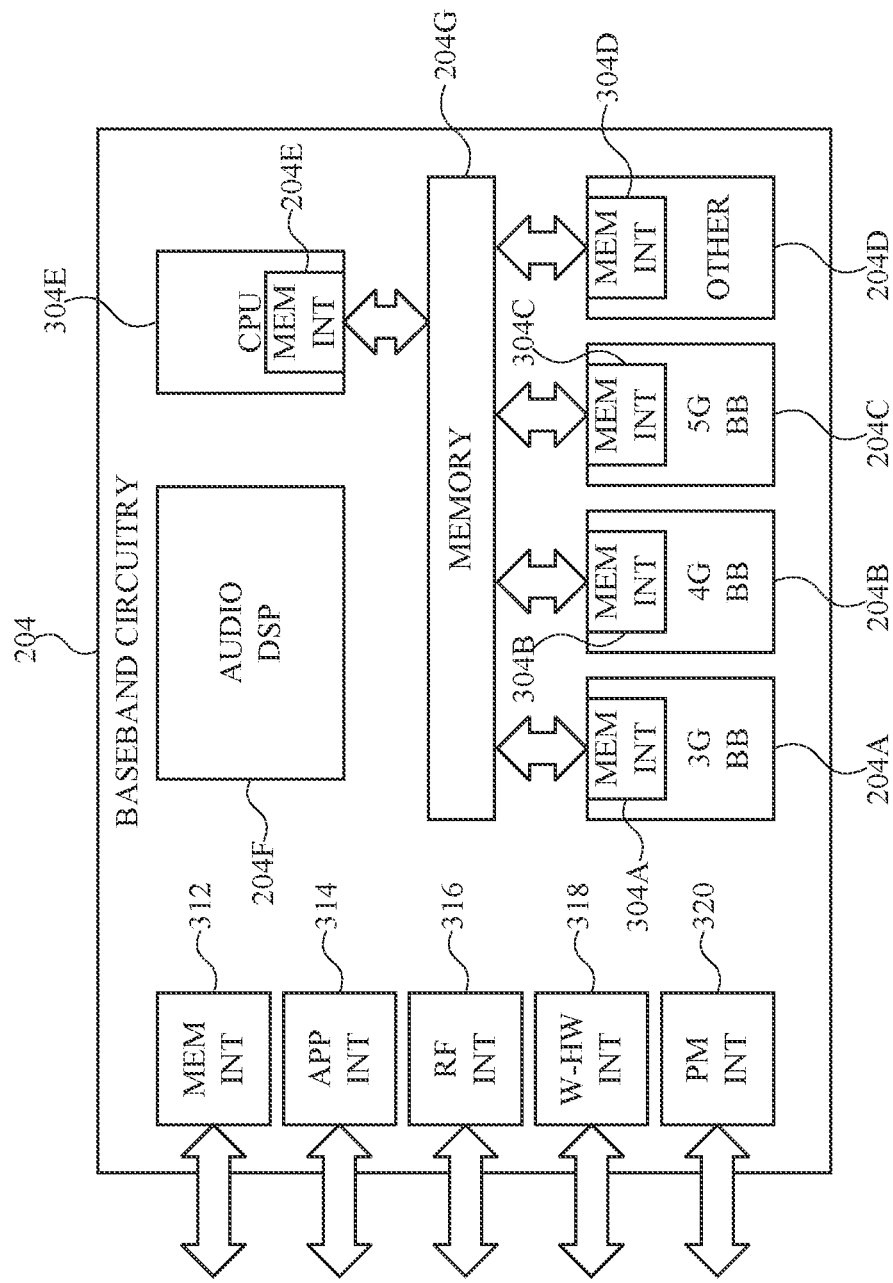
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, BLUETOOTH® components (e.g., BLUETOOTH® Low Energy), WI-FI® components, and other communication components), and a power management interface 320 (e.g., an interface to send/receive power or control signals to/from the PMC 212).

As discussed in greater detail herein, various embodiments can facilitate enhancements to Vehicle to Everything (V2X) security policy negotiation between peer User Equipments (UEs). Various embodiments can employ techniques discussed herein that improve on existing security policy negotiation for V2X, for example by providing improved security via addressing existing security issues.

Figure 4:
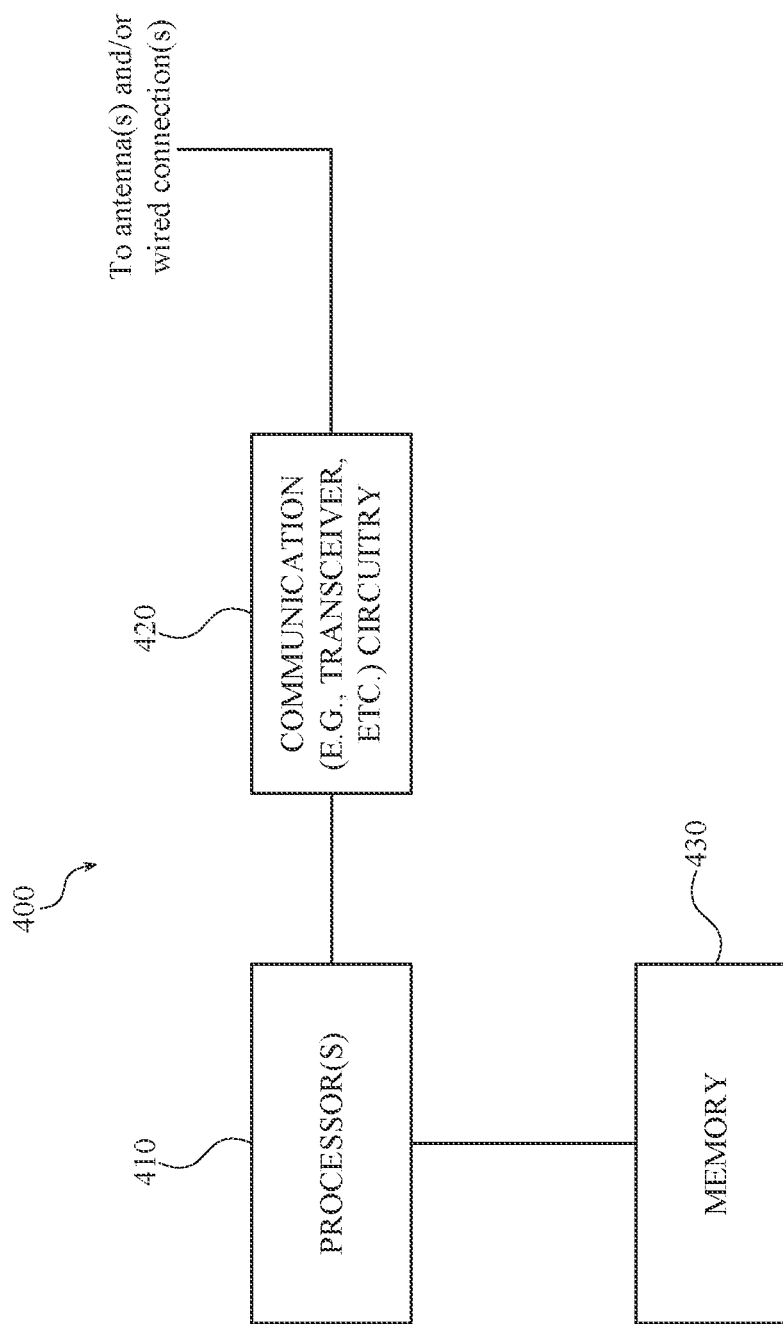
FIG. 4 is a block diagram illustrating a system that facilitates V2X (Vehicle to Everything) security policy negotiation between peer UEs, according to various embodiments discussed herein.

Referring to FIG. 4, illustrated is a block diagram of a system 400 employable at a UE (User Equipment), a next generation Node B (gNodeB or gNB) or other BS (base station)/TRP (Transmit/Receive Point), or another component of a 3GPP (Third Generation Partnership Project) network (e.g., a 5GC (Fifth Generation Core Network)) component or function such as a UPF (User Plane Function)) that facilitates V2X (Vehicle to Everything) security policy negotiation between peer UEs, according to various embodiments discussed herein. System 400 can include processor(s) 410, communication circuitry 420, and memory 430. Processor(s) 410 (e.g., which can comprise one or more of application circuitry 202 and/or processors 204A-204F, etc.) can comprise processing circuitry and associated interface(s) (e.g., a communication interface (e.g., RF circuitry interface 316) for communicating with communication circuitry 420, a memory interface (e.g., memory interface 312) for communicating with memory 430, etc.). Communication circuitry 420 can comprise, for example circuitry for wired and/or wireless connection(s) (e.g., 206 and/or 208), which can include transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof). Memory 430 can comprise one or more memory devices (e.g., memory 204G, local memory (e.g., including CPU register(s)) of processor(s) discussed herein, etc.) which can be of any of a variety of storage mediums (e.g., volatile and/or non-volatile according to any of a variety of technologies/constructions, etc.), and can store instructions and/or data associated with one or more of processor(s) 410 or transceiver circuitry 420).

Specific types of embodiments of system 400 (e.g., UE embodiments) can be indicated via subscripts (e.g., system $400_{UE}$ comprising processor(s) $410_{UE}$, communication circuitry $420_{UE}$, and memory $430_{UE}$). In some embodiments, such as BS embodiments (e.g., system $400_{gNB}$) and network component (e.g., UPF (User Plane Function), etc.) embodiments (e.g., system $400_{UPF}$) processor(s) $410_{gNB}$ (etc.), communication circuitry (e.g., $420_{gNB}$, etc.), and memory (e.g., $430_{gNB}$, etc.) can be in a single device or can be included in different devices, such as part of a distributed architecture. In embodiments, signaling or messaging between different embodiments of system 400 (e.g., $400_1$ and $400_2$) can be generated by processor(s) $410_1$, transmitted by communication circuitry $420_1$ over a suitable interface or reference point (e.g., a 3GPP air interface, N3, N4, etc.), received by communication circuitry $420_2$, and processed by processor(s) $410_2$. Depending on the type of interface, additional components (e.g., antenna(s), network port(s), etc. associated with system(s) $400_1$ and $400_2$) can be involved in this communication.

In various aspects discussed herein, signals and/or messages can be generated and output for transmission, and/or transmitted messages can be received and processed. Depending on the type of signal or message generated, outputting for transmission (e.g., by processor(s) 410, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping to one or more Resource Elements (REs) (e.g., a scheduled set of resources, a set of time and frequency resources granted for uplink transmission, etc.), wherein each RE can span one subcarrier in a frequency domain and one symbol in a time domain (e.g., wherein the symbol can be according to any of a variety of access schemes, e.g., Orthogonal Frequency Division Multiplexing (OFDM), Single Carrier Frequency Division Multiple Access (SC-FDMA), etc.). Depending on the type of received signal or message, processing (e.g., by processor(s) 410, etc.) can comprise one or more of: identifying physical resources associated with the signal/message, detecting the signal/message, resource element group deinterleaving, demodulation, descrambling, and/or decoding.

In various aspects, one or more of information (e.g., system information, resources associated with signaling, etc.), features, parameters, etc. can be configured to a UE via signaling (e.g., associated with one or more layers, such as L1 signaling or higher layer signaling (e.g., MAC, RRC, etc.)) from a gNB or other access point (e.g., via signaling generated by processor(s) 410$_{gNB}$, transmitted by communication circuitry 420$_{gNB}$, received by communication circuitry 420$_{UE}$, and processed by processor(s) 410$_{UE}$). Depending on the type of information, features, parameters, etc., the type of signaling employed and/or the exact details of the operations performed at the UE and/or gNB in processing (e.g., signaling structure, handling of PDU(s)/SDU(s), etc.) can vary. However, for convenience, such operations can be referred to herein as configuring information/feature(s)/parameter(s)/etc. to a UE, generating or processing configuration signaling, or via similar terminology.

The general procedure in existing systems for V2X security establishment between peer UEs is discussed in 3GPP (Third Generation Partnership Project) TS (Technical Specification) 33.536. Currently, in TS 33.536, for NR (New Radio) PC5 (Proximity-based Communication (Interface) 5) unicast the UE is provisioned with the following security policy in the service authorization procedure, together with the list of V2X services (e.g. PSIDs (Provider Service Identifiers) or ITS (Intelligent Transportation System)-AIDs (Application Identifiers) of the V2X applications), with Geographical Area(s) and their security policy which indicates the following policy: (1) Signaling integrity protection (which can be one of REQUIRED/PREFERRED/OFF); (2) Signaling confidentiality protection (which can be one of REQUIRED/PREFERRED/OFF); (3) User plane integrity protection (which can be one of REQUIRED/PREFERRED/OFF); and (4) User plane confidentiality protection (which can be one of REQUIRED/PREFERRED/OFF).

Figure 5:
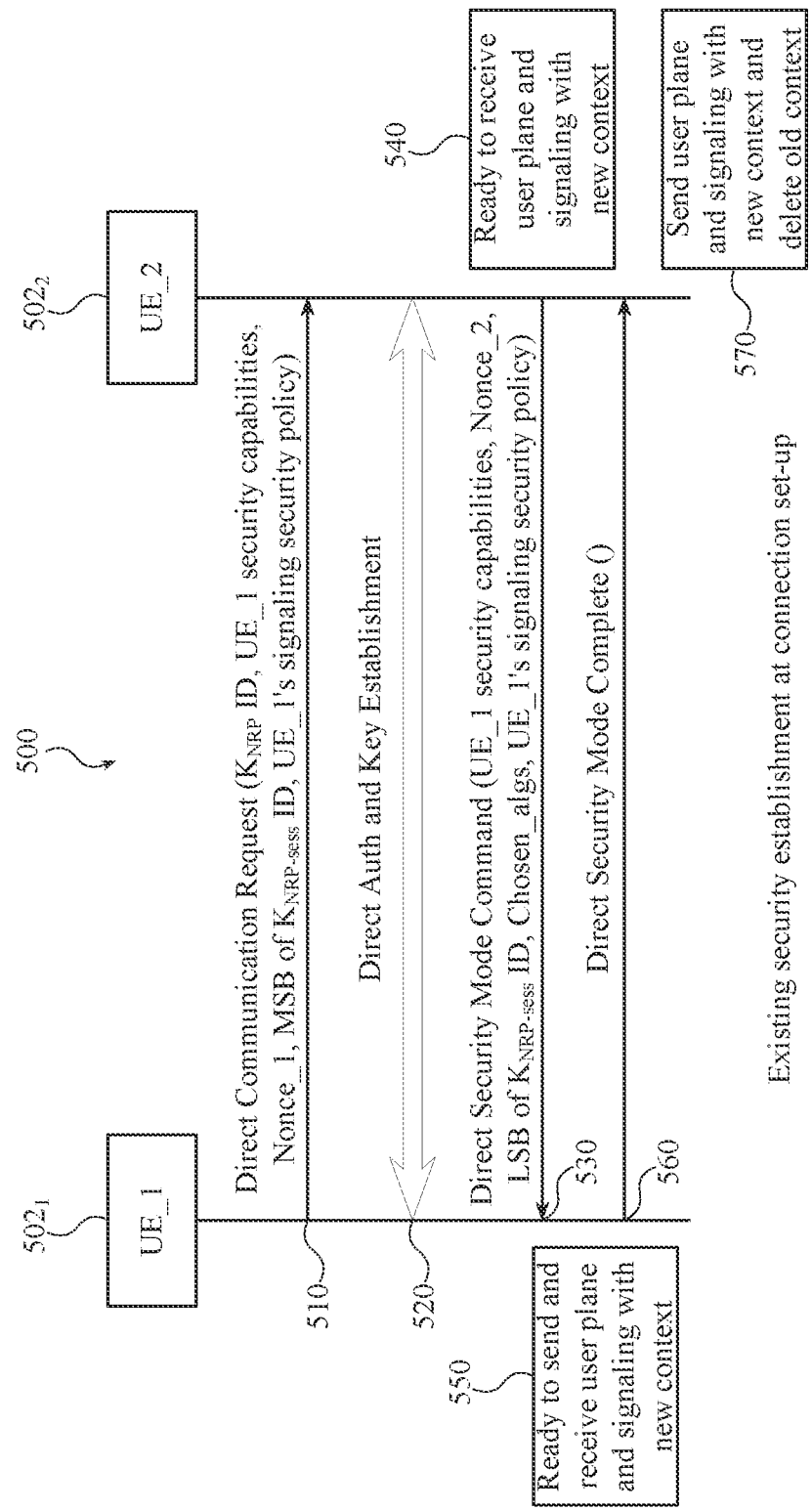
FIG. 5 is a diagram illustrating he existing procedure for V2X security establishment at connection set-up, in connection with various aspects discussed herein.

Referring to FIG. 5, illustrated is a diagram showing the existing procedure 500 for V2X security establishment at connection set-up, in connection with various aspects discussed herein. In procedure 500, the initiating UE 502$_1$ (UE_1) sends its security policy in a Direct Communication Request, the receiving UE 502$_2$ (UE_2) takes the security policy, chooses an algorithm supported by initiating UE 502$_1$ (UE_1) and sends it back. Then the initiating UE 502$_1$ (UE_1) can use this algorithm to protect the Direct Security Mode Complete message.

At 510, UE_1 502$_1$ sends the Direct Communication Request to UE_2 502$_2$, indicating the UE_1 502$_1$ security capabilities and UE_1 502$_1$ signaling security policy.

At 520, UE_2 502$_2$ can initiate a Direct Authentication and Key Establishment procedure with UE_1 502$_1$. This can be mandatory if UE_2 502$_2$ does not have the K$_{NRP}$ and K$_{NRP}$ ID pair indicated at 510, and signaling can be used to establish the keys for the particular use case.

At 530, UE_2 502$_2$ can send the Direct Security Mode Command message to UE_1 502$_1$. UE_2 502$_1$ can include the Chosen_algs ("Chosen algorithms") parameter to indicate which security algorithms the UEs 502$_1$ and 502$_2$ will use to protect the data in the message. The Chosen_algs can indicate the use of the NULL integrity algorithm only if the signaling security policy of UE_2 502$_2$ has integrity as OFF or PREFERRED. UE_2 502$_2$ can derive the confidentiality and integrity keys based on the chosen algorithms. UE_2 502$_2$ can integrity protect the Direct Security Mode Command before sending it to UE_1 502$_1$. After sending the Direct Security Mode Command, at 540, UE_2 502$_2$ is ready to receive user plane and signaling with the new context.

At 550, UE_1 502$_1$ can also check the integrity protection on the Direct Security Mode Command message. UE_1 can accept the NULL integrity algorithm only if its security policy for signaling indicates that integrity protection is OFF or PREFERRED.

However, the existing security establishment procedure has the following security issues: (1) only UE_2 502$_2$ has the power to decide on the final security algorithm and (2) UE_2 502$_2$ cannot reject the connection even when it is not possible for the security capability and/or policy of UE_1 502$_1$ to match the policy of UE_2 502$_2$.

In various embodiments, techniques discussed herein can be employed for establishing security at V2X direct connection setup. These techniques can comprise an improved procedure for security establishment at connection setup, which can provide for: (1) UE_2 502$_2$ (the receiving UE) indicating its security policy and security capability to UE_1 502$_1$ (the initiating UE), after which UE_1 502$_1$ can make a decision on the chosen algorithms based on the policy and security capability of UE_2 502$_2$ and (2) UE_2 502$_2$ being able to reject the connection based on one or more of the capability and/or policy of UE_1 502$_1$ and/or the policy of UE_2 502$_2$.

Security Establishment Procedures

In contrast to the existing V2X security establishment procedure, security establishment according to various embodiments discussed herein can provide both the initiating UE 502$_1$ (UE_1) and the receiving UE 502$_2$ (UE_2) with the flexibility to negotiate the security policy. In various embodiments, after UE_1 502$_1$ send the Direct Communication Request (DCR) to UE_2 502$_2$, UE_2 502$_2$ can make a decision on whether to accept the connection based on the security capability and security policy of UE_1 502$_1$ and the security policy of UE_2 502$_2$. If UE_2 502$_2$ decides to accept the security policy of UE_1 502$_2$, then UE_2 502$_2$ can include its security capability and security policy in the Direct Security Mode Command, based at least on which UE_1 502$_1$ can determine whether to accept the connection. Additionally, although various embodiments and examples discuss the scenario of establishing security for a single V2X connection (or rejecting the connection), in various embodiments, the direct communication request from the initiating UE can be sent to more than one peer UE, with which the initiating UE can establish (or reject or have rejected) security for direct V2X communication.

Various embodiments can employ the security policy discussed herein for establishing security policy between peer UEs in V2X communications. These techniques discuss the security policy and how UEs can handle the policy, both in terms of an overall flow for negotiating security policy between a pair of peer UEs, as well as individual methods for an initiating UE $502_1$ and a receiving UE $502_2$. There are two different cases when an overall security context may be established; to set up a new connection and to re-key an ongoing connection. Techniques discussed herein can facilitate setting up a new connection.

The New Radio (NR) PC5 (Proximity-based Communication (Interface) 5) link can support activation or deactivation of security based on the network security policy similar to Uu (Radio interface between a Third Generation Partnership Project (3GPP) Radio Access Network (RAN) and the User Equipment), as defined in TS 33.501. Security policy for PC5 link can be provisioned for NR PC5 V2X communication, as discussed in greater detail below.

For handling the security policy for the NR PC5 link, the PCF can also provision the UP (User Plane) security policy per V2X application, during service authorization and information provisioning procedure as defined in TS 23.287.

For NR PC5 Unicast, the UE can be provisioned with the following security policy: The list of V2X services, e.g. PSIDs or ITS-AIDs of the V2X applications, with Geographical Area(s) and their security policy which indicates the following: (1) Signalling integrity protection (REQUIRED/PREFERRED/OFF); (2) Signalling confidentiality protection (REQUIRED/PREFERRED/OFF); (3) User plane integrity protection (REQUIRED/PREFERRED/OFF); and/or (4) User plane confidentiality protection (REQUIRED/PREFERRED/OFF). No integrity protection on signalling traffic can enable services that do not require security, e.g., emergency services. Although OFF is discussed herein as a third security policy option, in various embodiments, NOT NEEDED can be employed in place of OFF.

The signalling integrity protection security policy being OFF means that the UE will only establish a connection with no security. The signalling integrity protection security policy being PREFERRED means that the UE can try to establish security but will accept the connection with no security. With the integrity protection security policy set to REQUIRED, the UE will only accept the connection if a non-NULL integrity algorithm is used for protection of the signalling traffic.

For the other cases, a setting of OFF means that the UE will only use NULL confidentiality algorithm for that traffic or apply no integrity protection, while a REQUIRED setting means that the UE will use a non-NULL algorithm. If the security policy is PREFERRED, then the UE can accept any algorithm for that particular protection. One use of PREFERRED is to enable a security policy to be changed without updating all UEs at once.

At initial connection, the initiating UE can include its signaling security policy in the Direct Communication Request message. The UE(s) responding to this can take account of this when choosing the algorithms in the Direct Security Mode Command message(s). The initiating UE can reject the Direct Security Mode Command if the algorithm choice does not match its policy.

When adding a V2X service to an existing connection, the UE responding to the request can reject the request if the signaling security in use does not match the policy for the new application.

The combination of security policies for UP Integrity Protection can result in the activation of integrity protection according to one or more of the following cases. Case 1, wherein both UP security policies indicate UP Integrity Protection "required," or one UP security policy indicates "required" and the other indicates "preferred," can result in activation of UP integrity protection for each user plane bearer individually of the service type when the PC5 unicast is established. Case 2, wherein both UP security policies indicate UP Integrity Protection "preferred," can result in activation or deactivation of UP integrity protection for each user plane bearer individually of the service type when the PC5 unicast is established based on local policy. Case 3, for other scenarios besides those of Case 1 and Case 2, can result in deactivation of UP integrity protection for each user plane bearer individually of the service type when the PC5 unicast is established.

For UP Ciphering Protection (e.g., UP confidentiality protection), the resulting activation can be the same as the UP integrity protection activation, but based on the corresponding security policies for UP confidentiality protection instead of those for UP integrity protection.

Figure 6:
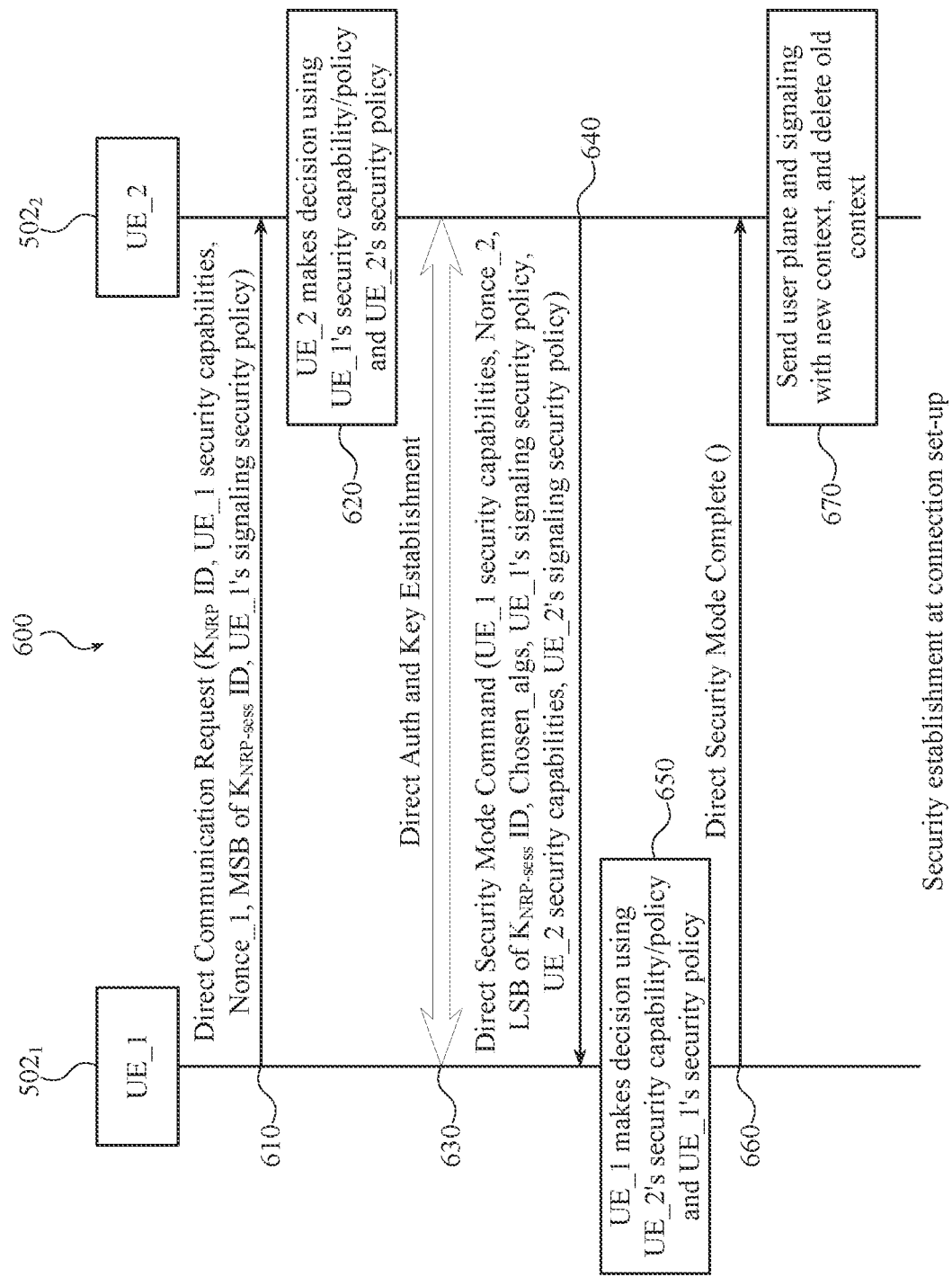
FIG. 6 is a diagram illustrating an example method for V2X security establishment at connection set-up that provides for improved security, according to various aspects discussed herein.

Referring to FIG. 6, illustrated is a diagram showing an example method 600 for V2X security establishment at connection set-up that provides for improved security, according to various aspects discussed herein. Method 600 describes one example of how security can be established during connection set-up by various embodiments discussed herein.

At 610, UE_1 $502_1$ can send a Direct Communication Request (DCR) to UE_2 $502_2$. This message can comprise Nonce_1 (for session key $K_{NRP}$-secs generation), UE_1 $502_1$ security capabilities (the list of algorithms that UE_1 $502_1$ will accept for this connection), the signaling security policy for UE_1 $502_1$, and the most significant 8-bits of the $K_{NRP}$-secs ID. These bits can be chosen such that UE_1 $502_1$ will be able to locally identify a security context that is created by method 600. The DCR can also comprise a $K_{NRP}$ ID if the UE_1 $502_1$ has an existing $K_{NRP}$ for the UE (UE_2 $502_2$) that it is trying to communicate with. The absence of the $K_{NRP}$ ID parameter can indicate that UE_1 $502_1$ does not have a $K_{NRP}$ for UE_2 $502_1$. The message can also comprise Key_Est_Info ("key establishment information," e.g., which can be a container that comprises the different data for each step of the key establishment process).

At 620, UE_2 $502_2$ can accept (continuing method 600) or refuse (ending method 600, e.g., and sending a Direct Security Mode Reject message) the direct communication request. For example, UE_2 $502_1$ can refuse the Direct Communication Request if the UE_1 $502_1$ security capability is NULL or signalling security policy of UE_1 $502_1$ is OFF while the security policy of UE_2 $502_2$ is REQUIRED. In the same or other embodiments, UE_2 $502_2$ can accept or refuse the direct communication request based on the decision-making strategy shown in Table 1, below.

TABLE 1

Example UE_2 Decision-Making Strategy for
Accepting/Refusing Direct Communication Request

| UE_1 Security Policy for Signaling Integrity Protection | UE_1 Security Capability | UE_2 Security Policy | UE_2's Decision |
|---|---|---|---|
| Any | Null | Required | Reject |
| Off | Any | Required | Reject |
| | | Others | Accept |

At 630, if UE_2 502$_2$ can initiate a Direct Auth and Key Establish procedure with UE_1 502$_1$. This can be mandatory if the UE_2 does not have the K$_{NRP}$ and K$_{NRP}$ ID pair indicated at 610, and signaling can be exchanged to establish the keys for the particular use case.

At 640, UE_2 502$_2$ can send a Direct Security Mode Command message to UE_1 502$_1$. This message can comprise the n (wherein n is an integer, e.g., which can be predetermined (e.g., 8, etc.) or chosen by UE_2 502$_2$) MSB of K$_{NRP}$ ID and optionally Key_Est_Info if a fresh K$_{NRP}$ is to be generated (see clause 5.3.3.1.3). UE_2 502$_2$ can include Nonce_2 to allow a session key to be calculated and the Chosen_algs ("Chosen algorithms") parameter to indicate which security algorithms the UEs will use to protect the data in the message. The Chosen_algs can depend on the signaling security policy of UE_2 502$_2$, for example, they can only indicate the use of the NULL integrity algorithm if the signaling security policy of UE_2 502$_2$ has integrity as OFF or PREFERRED. UE_2 502$_2$ can also include its security capabilities and signalling security policy in the information for UE_1 502$_1$, so that UE_1 502$_1$ can make decision based on the security policy and security capability of UE_2 502$_2$. UE_2 502$_2$ can also return the UE_1 502$_1$ security capabilities and signaling security policy to provide protection against bidding down attacks. UE_2 502$_2$ can also include the m (wherein m is an integer, e.g., 8, etc.) least significant bits of K$_{NRP}$-secs ID in the Direct Security Mode Command message. These bits can be chosen so that UE_2 502$_2$ can be able to locally identify a security context that is created by this procedure. UE_2 502$_2$ can calculate K$_{NRP-Sess}$ from K$_{NRP}$ and both Nonce_1 and Nonce_2, and then can derive the confidentiality and integrity keys based on the chosen algorithms. UE_2 502$_2$ can integrity protect the Direct Security Mode Command before sending it to UE_1 502$_1$. After sending the Direct Security Mode Command, UE_2 502$_2$ is ready to receive both signaling and user plane traffic protected with the new security context. UE_2 502$_2$ can form the K$_{NRP-sess}$ ID from the most significant bits it received in the Direct Communication Request of 610 and the least significant bits it sent in the Direct Security Mode Command.

At 650, upon receiving the Direct Security Mode Command, UE_1 502$_1$ can decide on whether to reject the connection or not based on its local policy and the security policy and security capability of UE_2 502$_2$. In various embodiments, UE_1 502$_1$ can accept or refuse the connection based on the decision-making strategy shown in Table 2, below.

TABLE 2

Example UE_1 Decision-Making Strategy
for Accepting/Refusing Connection

| UE_1 Security Policy for Signaling Integrity Protection | Chosen_algs | UE_2 Security Capability | UE_2 Security Policy | UE_1's Decision |
|---|---|---|---|---|
| Preferred | Null | Not null | Preferred/Off | Reject |
| Required | Null | Any | Any | Reject |
| Preferred | Null | Null | Any | Accept |
| Off | Null | Any | Any | Accept |
| Other Cases | | | | Accept |

UE_1 502$_1$ can also check that the received LSB of K$_{NPR-sess}$ ID is unique, that is, it has not been sent by another UE responding to the Direct Communication Request at 610. If the LSB of K$_{NPR-sess}$ ID is not unique, then UE_1 502$_1$ can respond with a Direct Security Mode Reject message that comprises a cause value to specify that the LSB of K$_{NPR-sess}$ ID is not unique. The peer UE_2 502$_2$ receiving a Direct Security Mode Reject message shall inspect the cause value, and if the cause is related to the session identifier uniqueness, then the UE_2 502$_2$ can generate a new LSB of K$_{NPR-sess}$ ID and reply to UE_1 502$_1$ again (e.g., method 600 can return to 640, wherein UE_2 502$_2$ can send a new Direct Security Mode Command message with the new LSB of K$_{NPR-sess}$ ID), and UE-2 502$_2$ can erase the former LSB of K$_{NPR-sess}$ ID from its memory. On receiving this new Direct Security Mode Command, UE_1 502$_1$ can process the message from the start of step 640. If the LSB of K$_{NPR-sess}$ ID is unique, UE_1 502$_1$ can calculate K$_{NRP-sess}$ and the confidentiality and integrity keys in the same way as UE_2 502$_2$. UE_1 502$_1$ can check that the returned UE_1 502$_1$ security capabilities and signaling security policy are the same as those it sent at 610. UE_1 502$_1$ can also check the integrity protection on the message. UE_1 502$_1$ can only accept the NULL integrity algorithm if its security policy for signalling indicates that integrity protection is OFF.

At 660, if all the checks in 650 pass, then UE_1 502$_1$ is ready to send and receive signalling and user plane traffic with the new security context. UE_1 502$_1$ can send an integrity protected and confidentiality protected (with the chosen algorithm, which can be the null algorithm) Direct Security Mode Complete message to UE_2 502$_2$. UE_1 502$_1$ can form the K$_{NRP}$-sess ID from the most significant bits it sent at 610 and least significant bits it received at 630.

At 670, UE_2 502$_2$ can checks the integrity protection on the received Direct Security Mode Complete message of 660. If this passes, UE_2 502$_2$ can send user plane data and control signalling protected with the new security context. UE_2 502$_2$ can also deletes any old security context it has for UE_1 502$_1$.

Figure 7:
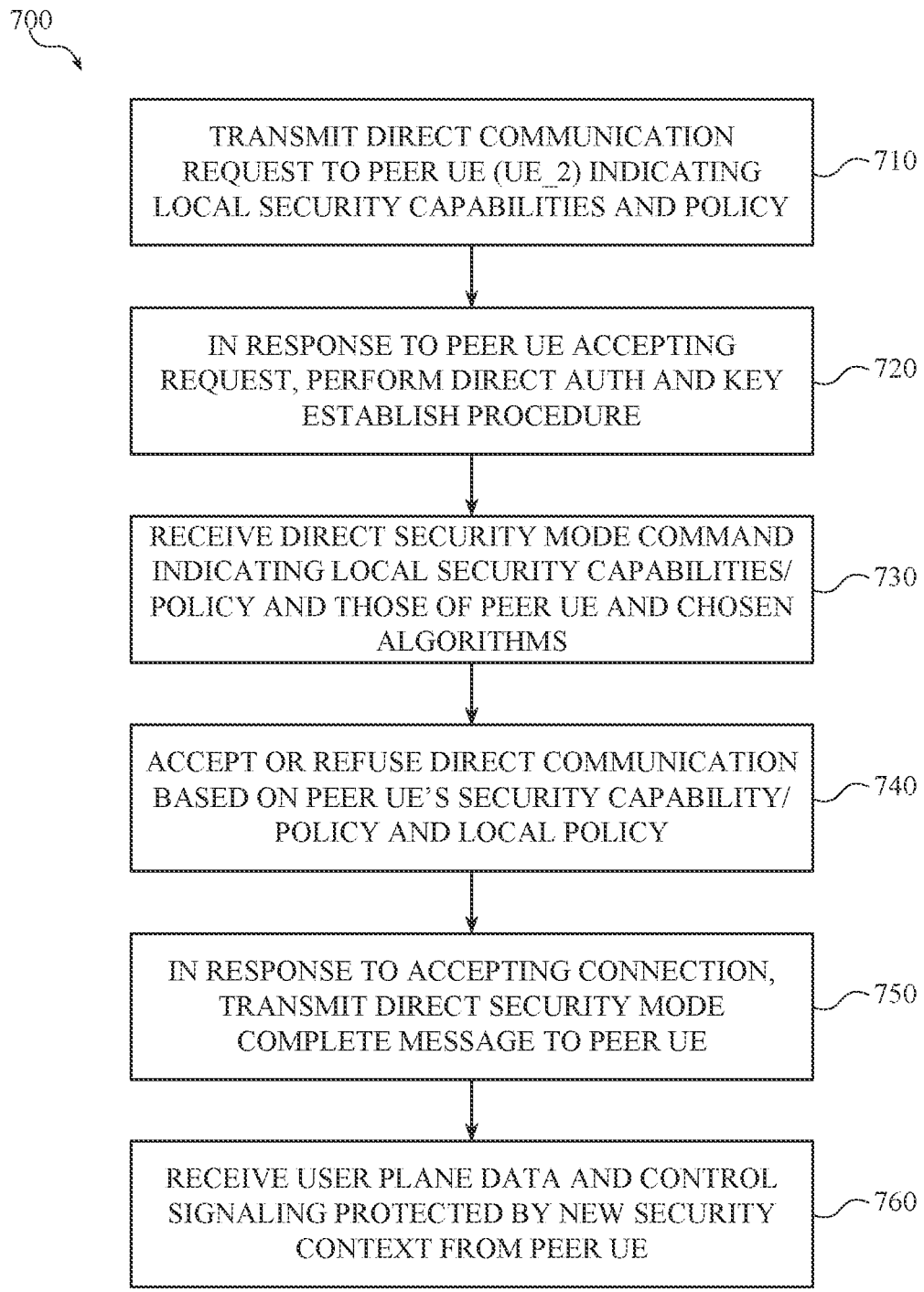
FIG. 7 is a flow diagram illustrating an example method employable at an initiating UE that facilitates V2X security policy negotiation between peer UEs, according to various embodiments discussed herein.

Referring to FIG. 7, illustrated is a flow diagram of an example method employable at an initiating UE that facilitates V2X security policy negotiation between peer UEs, according to various embodiments discussed herein. In other aspects, a machine readable medium can store instructions associated with method 700 that, when executed, can cause a UE (e.g., employing system 400$_{UE}$) to perform the acts of method 700.

At 710, the initiating UE (e.g., UE_1 502$_1$) can transmit a Direct Communication Request (DCR) to a peer UE (e.g., UE_2 502$_2$), wherein the DCR can indicate security capabilities of the initiating UE and a signaling security policy of the initiating UE.

At 720, in response to the peer UE accepting the request, a direct auth and key establish procedure can be performed between the initiating UE and the peer UE. Alternately, the peer UE can refuse the connection (e.g., and the initiating UE can receive a Direct Security Mode Reject message, which can indicate the reason), ending method 700.

At 730, a direct security mode command can be received, indicating the initiating UE's security capabilities and signaling security policy, the peer UE's security capabilities and signaling security policy, and the chosen algorithms for security (e.g., which can be null).

At 740, a determination can be made whether to accept or reject the connection based on the initiating UE's security policy for signaling integrity protection, the chosen algorithms, and the peer UE's security capabilities and signaling security policy.

At 750, in response to accepting the connection, a direct security mode complete message can be transmitted based on the new security context (e.g., based at least in part on the chosen algorithms). Alternately, in response to rejecting the connection, a direct security mode reject message can be transmitted, which can indicate the reason.

At 760, user plane data and control signaling can be received from the peer UE, which can be protected by the new security context.

Additionally or alternatively, method 700 can include one or more other acts described herein in connection with various embodiments of a UE and/or system $400_{UE}$ when that UE acts as an initiating UE (e.g., UE_1 $502_1$) for V2X security establishment at connection set-up.

Figure 8:
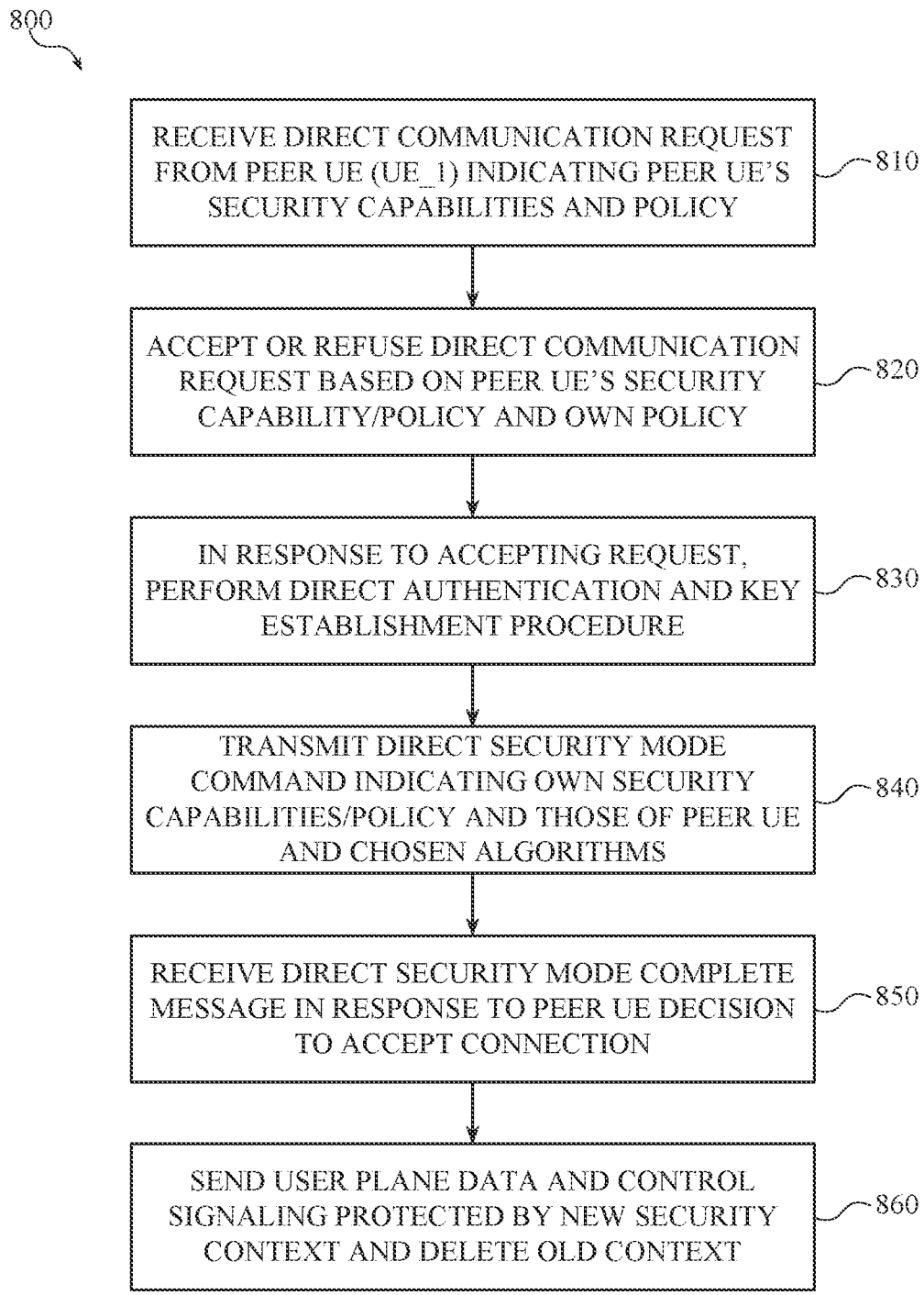
FIG. 8 is a flow diagram illustrating an example method employable at a receiving UE that facilitates V2X security policy negotiation between peer UEs, according to various embodiments discussed herein.

Referring to FIG. 8, illustrated is a flow diagram of an example method employable at a receiving UE that facilitates V2X security policy negotiation between peer UEs, according to various embodiments discussed herein. In other aspects, a machine readable medium can store instructions associated with method 800 that, when executed, can cause a UE (e.g., employing system $400_{UE}$) to perform the acts of method 800.

At 810, a Direct Communication Request (DCR) can be received at a receiving UE (e.g., UE_2 $502_2$) from a peer UE (e.g., UE_1 $502_1$), wherein the DCR can indicate security capabilities of the peer UE and a signaling integrity protection security policy of the peer UE.

At 820, a determination can be made whether to accept or reject the DCR based on the peer UE's security capabilities and signaling security policy, and a signaling security policy of the receiving UE.

At 830, in response to accepting the DCR, chosen algorithms for security can be determined, and direct authentication and key establishment can be performed with the peer UE. Alternatively, in response to refusing the connection (e.g., and transmitting a Direct Security Mode Reject message to the peer UE, which can indicate the reason), method 800 can end.

At 840, a direct security mode command can be transmitted, indicating the initiating (peer) UE's security capabilities and signaling security policy, the receiving UE's security capabilities and signaling security policy, and the chosen algorithms for security (e.g., which can be null).

At 850, in response to the peer UE accepting the connection, a direct security mode complete message can be received based on the new security context (e.g., based at least in part on the chosen algorithms). Alternately, the peer UE can reject the connection, and a direct security mode reject message can be received, which can indicate the reason.

At 860, user plane data and control signaling can be transmitted to the peer UE, which can be protected by the new security context.

Additionally or alternatively, method 800 can include one or more other acts described herein in connection with various embodiments of a UE and/or system $400_{UE}$ when that UE acts as a receiving UE (e.g., UE_2 $502_2$) for V2X security establishment at connection set-up.

Additional Examples

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed in a User Equipment (UE), comprising: one or more processors configured to: generate a Direct Communication Request for a peer UE, wherein the Direct Communication Request indicates security capabilities for the UE and a signaling security policy for the UE; perform a Direct Auth and Key Establish procedure with the peer UE; process a Direct Security Mode Command from the peer UE, wherein the Direct Security Mode Command indicates the security capabilities for the UE, the signaling security policy for the UE, a set of chosen algorithms for data protection, the security capabilities for the peer UE, and a signaling security policy for the peer UE; determine whether to accept the connection, based at least on the signaling security policy for the UE, the security capabilities for the peer UE, and the signaling security policy for the peer UE; and in response to a determination to accept the connection, generate a Direct Security Mode Complete message for the peer UE based at least on the set of chosen algorithms.

Example 2 comprises the subject matter of any variation of any of example(s) 1, wherein the one or more processors are further configured to process one or more of user plane data or control signaling from the peer UE, wherein the one or more of user plane data or the control signaling are based at least on the set of chosen algorithms.

Example 3 comprises the subject matter of any variation of any of example(s) 1-2, wherein, when the set of chosen algorithms comprise a NULL integrity algorithm, the one or more processors are configured to determine to accept the connection only when the signaling security policy for the UE is OFF.

Example 4 comprises the subject matter of any variation of any of example(s) 1-2, wherein, when the set of chosen algorithms comprise a NULL integrity algorithm, the one or more processors are configured to determine to accept the connection at least when the signaling security policy for the UE is OFF or when the signaling security policy for the UE is PREFERRED and the security capabilities for the peer UE comprise a NULL for signaling integrity protection.

Example 5 comprises the subject matter of any variation of any of example(s) 1-4, wherein, when the set of chosen algorithms comprise an integrity algorithm other than NULL, the one or more processors are configured to determine to accept the connection when the signaling security policy for the UE is REQUIRED or PREFERRED.

Example 6 comprises the subject matter of any variation of any of example(s) 1-5, wherein, in response to a determination to reject the connection, the one or more processors are further configured to generate a Direct Security Mode Reject message for the peer UE.

Example 7 is a UE comprising the subject matter of any variation of any of example(s) 1-6.

Example 8 is an apparatus configured to be employed in a User Equipment (UE), comprising: one or more processors configured to: process a Direct Communication Request from a peer UE, wherein the Direct Communication Request indicates security capabilities for the peer UE and a signaling security policy for the peer UE; determine whether to accept or refuse the Direct Communication Request based at least on the security capabilities for the peer UE, the signaling security policy for the peer UE, and a signaling security policy for the UE; and in response to a determination to accept the Direct Communication Request: perform a Direct Auth and Key Establish procedure with the peer UE; generate a Direct Security Mode Command for the peer UE, wherein the Direct Security Mode Command indicates the security capabilities for the UE, the signaling security policy for the UE, a set of chosen algorithms for data protection, the security capabilities for the peer UE, and a signaling security policy for the peer UE; and process a Direct Security Mode Complete message from the peer UE based at least on the set of chosen algorithms.

Example 9 comprises the subject matter of any variation of any of example(s) 8, wherein the one or more processors are further configured to generate one or more of user plane data or control signaling for the peer UE, wherein the one or more of user plane data or the control signaling are based at least on the set of chosen algorithms.

Example 10 comprises the subject matter of any variation of any of example(s) 8-9, wherein, when the signaling security policy for the UE is REQUIRED, the one or more processors are configured to determine to reject the request when the security capabilities for the peer UE comprise a NULL for signaling integrity protection.

Example 11 comprises the subject matter of any variation of any of example(s) 8-10, wherein, when the signaling security policy for the UE is REQUIRED, the one or more processors are configured to determine to reject the request when the signaling security policy for the peer UE is OFF.

Example 12 comprises the subject matter of any variation of any of example(s) 8-11, wherein the one or more processors are configured to determine to accept the request unless the signaling security policy for the UE is REQUIRED and one or more of the security capabilities for the peer UE comprise a NULL for signaling integrity protection or the signaling security policy for the peer UE is OFF.

Example 13 comprises the subject matter of any variation of any of example(s) 8-12, wherein, in response to a determination to reject the request, the one or more processors are further configured to generate a Direct Security Mode Reject message for the peer UE.

Example 14 is a UE comprising the subject matter of any variation of any of example(s) 8-13.

Example 15 is a machine-readable medium comprising instructions that, when executed, cause a User Equipment (UE) to: send a Direct Communication Request for a peer UE, wherein the Direct Communication Request indicates security capabilities for the UE and a signaling security policy for the UE; perform a Direct Auth and Key Establish procedure with the peer UE; receive a Direct Security Mode Command from the peer UE, wherein the Direct Security Mode Command indicates the security capabilities for the UE, the signaling security policy for the UE, a set of chosen algorithms for data protection, the security capabilities for the peer UE, and a signaling security policy for the peer UE; determine whether to accept the connection, based at least on the signaling security policy for the UE, the security capabilities for the peer UE, and the signaling security policy for the peer UE; and in response to a determination to accept the connection, send a Direct Security Mode Complete message for the peer UE based at least on the set of chosen algorithms.

Example 16 comprises the subject matter of any variation of any of example(s) 15, wherein, when the set of chosen algorithms comprise a NULL integrity algorithm, the instructions, when executed, cause the UE to determine to accept the connection only when the signaling security policy for the UE is OFF.

Example 17 comprises the subject matter of any variation of any of example(s) 15-16, wherein, when the set of chosen algorithms comprise an integrity algorithm other than NULL, the instructions, when executed, cause the UE to determine to accept the connection when the signaling security policy for the UE is REQUIRED or PREFERRED.

Example 18 is a machine-readable medium comprising instructions that, when executed, cause a User Equipment (UE) to: receive a Direct Communication Request from a peer UE, wherein the Direct Communication Request indicates security capabilities for the peer UE and a signaling security policy for the peer UE; determine whether to accept or refuse the Direct Communication Request based at least on the security capabilities for the peer UE, the signaling security policy for the peer UE, and a signaling security policy for the UE; and in response to a determination to accept the Direct Communication Request: perform a Direct Auth and Key Establish procedure with the peer UE; send a Direct Security Mode Command for the peer UE, wherein the Direct Security Mode Command indicates the security capabilities for the UE, the signaling security policy for the UE, a set of chosen algorithms for data protection, the security capabilities for the peer UE, and a signaling security policy for the peer UE; and receive a Direct Security Mode Complete message from the peer UE based at least on the set of chosen algorithms.

Example 19 comprises the subject matter of any variation of any of example(s) 18, wherein, when the signaling security policy for the UE is REQUIRED, the instructions, when executed, cause the UE to reject the request when one or more of the security capabilities for the peer UE comprise a NULL for signaling integrity protection or the signaling security policy for the peer UE is OFF.

Example 20 comprises the subject matter of any variation of any of example(s) 18-19, wherein the instructions, when executed, cause the UE to determine to accept the request unless the signaling security policy for the UE is REQUIRED and one or more of the security capabilities for the peer UE comprise a NULL for signaling integrity protection or the signaling security policy for the peer UE is OFF.

Example 21 comprises an apparatus comprising means for executing any of the described operations of examples 1-20.

Example 22 comprises a machine readable medium that stores instructions for execution by a processor to perform any of the described operations of examples 1-20.

Example 23 comprises an apparatus comprising: a memory interface; and processing circuitry configured to: perform any of the described operations of examples 1-20.

The above description of illustrated embodiments of the subject disclosure, including what is described in the Abstract, is not intended to be exhaustive or to limit the disclosed embodiments to the precise forms disclosed.

While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus configured to be employed in a User Equipment (UE), comprising:
    one or more processors configured to cause the UE to:
        transmit, to a peer UE, a Direct Communication Request for a connection to the peer UE, wherein the Direct Communication Request indicates security capabilities of the UE and a signaling security policy of the UE;
        receive, from the peer UE, a Direct Security Mode Reject message when the peer UE rejects the Direct Communication Request based on a comparison of a security policy of the peer UE with the signaling security policy of the UE or with the security capabilities of the UE;
        receive, from the peer UE, a Direct Security Mode Command, wherein the Direct Security Mode Command indicates the security capabilities of the UE, the signaling security policy of the UE and a set of chosen algorithms for data protection;
        determine whether to accept the connection, based at least on the signaling security policy of the UE; and
        in response to a determination to accept the connection, transmit, to the peer UE, a Direct Security Mode Complete message for the peer UE based at least on the set of chosen algorithms.

2. The apparatus of claim 1, wherein the one or more processors are further configured to cause the UE to receive, from the peer UE, one or more of user plane data or control signaling, wherein the one or more of user plane data or the control signaling are based at least on the set of chosen algorithms.

3. The apparatus of claim 1, wherein, when the set of chosen algorithms comprise a NULL integrity algorithm, the one or more processors are configured to cause the UE to determine to accept the connection only when the signaling security policy of the UE is OFF.

4. The apparatus of claim 1, wherein, when the set of chosen algorithms comprise a NULL integrity algorithm, the one or more processors are configured to cause the UE to determine to accept the connection at least when the signaling security policy of the UE is OFF or when the signaling security policy of the UE is PREFERRED and security capabilities of the peer UE comprise a NULL for signaling integrity protection.

5. The apparatus of claim 1, wherein, when the set of chosen algorithms comprise an integrity algorithm other than NULL, the one or more processors are configured to cause the UE to determine to accept the connection when the signaling security policy of the UE is REQUIRED or PREFERRED.

6. The apparatus of claim 1, wherein, in response to a determination to reject the connection, the one or more processors are further configured to cause the UE to transmit, to the peer UE, a Direct Security Mode Reject message.

7. The apparatus of claim 1, wherein the Direct Security Mode Reject message is received at the UE, when the signaling security policy of the UE is NOT NEEDED and the security policy of the peer UE is REQUIRED.

8. The apparatus of claim 1, wherein the Direct Security Mode Command further indicates security capabilities of the peer UE and the security policy of the peer UE, and wherein the one or more processors is configured to cause the UE to determine whether to accept the connection further based on the security capabilities of the peer UE and the security policy of the peer UE.

9. An apparatus configured to be employed in a User Equipment (UE), comprising:
    one or more processors configured to cause the UE to:
        receive, from a peer UE, a Direct Communication Request, wherein the Direct Communication Request indicates security capabilities of the peer UE and a signaling security policy of the peer UE;
        selectively reject the Direct Communication Request based on a comparison of the security capabilities of the peer UE or the signaling security policy of the peer UE with a security policy of the UE; and
        in response to a determination to accept the Direct Communication Request:
            transmit, to the peer UE, a Direct Security Mode Command, wherein the Direct Security Mode Command indicates a set of chosen algorithms for data protection, the security capabilities of the peer UE, and the signaling security policy of the peer UE; and
            receive, from the peer UE, a Direct Security Mode Complete message based at least on the set of chosen algorithms.

10. The apparatus of claim 9, wherein the one or more processors are further configured to cause the UE to transmit, to the peer UE, one or more of user plane data or control signaling, wherein the one or more of user plane data or the control signaling are based at least on the set of chosen algorithms.

11. The apparatus of claim 9, wherein, when the security policy of the UE is REQUIRED, the one or more processors are configured to cause the UE to reject the Direct Communication Request when the security capabilities of the peer UE comprise a NULL for signaling integrity protection.

12. The apparatus of claim 9, wherein, when the security policy of the UE is REQUIRED, the one or more processors are configured to cause the UE to reject the Direct Communication Request when the signaling security policy of the peer UE is NOT NEEDED.

13. The apparatus of claim 9, wherein the one or more processors are configured to cause the UE to determine to accept the Direct Communication Request unless the signaling security policy of the UE is REQUIRED and one or more of the security capabilities of the peer UE comprise a NULL for signaling integrity protection or the signaling security policy of the peer UE is NOT NEEDED.

14. The apparatus of claim 9, wherein, in response to a determination to reject the Direct Communication Request, the one or more processors are further configured to cause the UE to transmit, to the peer UE, a Direct Security Mode Reject message.

15. The apparatus of claim 9, wherein the Direct Security Mode Command further indicates security capabilities of the UE and the security policy of the UE.

16. A non-transitory machine-readable medium comprising instructions that, when executed by one or more processors of a User Equipment (UE), cause the UE to:
send transmit, to a peer UE, a Direct Communication Request for a connection to the peer UE, wherein the Direct Communication Request indicates security capabilities of the UE and a signaling security policy of the UE;
receive, from the peer UE, a Direct Security Mode Reject message when the peer UE rejects the Direct Communication Request based on a comparison of a security policy of the peer UE with the signaling security policy of the UE or with the security capabilities of the UE;
receive, from the peer UE, a Direct Security Mode Command, wherein the Direct Security Mode Command indicates the security capabilities of the UE, the signaling security policy of the UE and a set of chosen algorithms for data protection;
determine whether to accept the connection, based at least on the signaling security policy of the UE; and
in response to a determination to accept the connection, transmit, to the peer UE, a Direct Security Mode Complete message based at least on the set of chosen algorithms.

17. The non-transitory machine-readable medium of claim 16, wherein the Direct Security Mode Command further indicates security capabilities of the peer UE and the security policy of the peer UE, and wherein the instructions, when executed by the one or more processors, cause the UE to determine whether to accept the connection further based on the security capabilities of the peer UE and the security policy of the peer UE.

18. The non-transitory machine-readable medium of claim 16, wherein, when the set of chosen algorithms comprise a NULL integrity algorithm, the instructions, when executed by the one or more processors, cause the UE to determine to accept the connection only when the signaling security policy of the UE is OFF.

19. The non-transitory machine-readable medium of claim 16, wherein, when the set of chosen algorithms comprise an integrity algorithm other than NULL, the instructions, when executed by the one or more processors, cause the UE to determine to accept the connection when the signaling security policy of the UE is REQUIRED or PREFERRED.

20. The non-transitory machine-readable medium of claim 16, wherein the Direct Security Mode Reject message is received at the UE, when the signaling security policy of the UE is NOT NEEDED and the security policy of the peer UE is REQUIRED.

* * * * *